United States Patent [19]
Luna

[11] Patent Number: 5,615,513
[45] Date of Patent: Apr. 1, 1997

[54] BEACH TROLLING DEVICE

[76] Inventor: Armando H. Luna, 35 W. 110th St., Apt. 6H, New York, N.Y. 10026

[21] Appl. No.: 488,902

[22] Filed: Jun. 9, 1995

[51] Int. Cl.⁶ .................................................. A01K 93/00
[52] U.S. Cl. ............................................................ 43/43.13
[58] Field of Search ......................... 43/43.13, 4, 27.2, 43/27.4

[56] References Cited

U.S. PATENT DOCUMENTS

| | | | |
|---|---|---|---|
| 1,307,623 | 6/1919 | Edmondson | 43/43.13 |
| 2,249,382 | 7/1941 | Henriksen | 43/43.13 |
| 2,255,465 | 9/1941 | Hickey | 43/43.13 |
| 2,572,427 | 10/1951 | Anglim | 43/43.13 |
| 2,597,288 | 5/1952 | Caldwell | 43/43.13 |
| 2,912,782 | 11/1959 | Maximov | 43/27.2 |
| 3,142,929 | 8/1964 | Killilea | 43/43.13 |
| 3,507,068 | 4/1970 | Roberts | 43/17 |
| 3,747,248 | 7/1973 | Baer | 43/43.13 |
| 3,748,775 | 7/1973 | Wagner | 43/43.13 |
| 3,760,762 | 9/1973 | Spongberg | 43/43.13 |
| 4,028,840 | 6/1977 | Wille | 43/43.13 |
| 4,461,115 | 7/1984 | Carrillo | 43/43.13 |
| 4,464,858 | 8/1984 | Wright | 43/43.13 |
| 4,524,538 | 6/1985 | Halvorsen | 43/43.13 |
| 5,165,196 | 11/1992 | Spickelmire | 43/43.13 |
| 5,222,317 | 6/1993 | Goergescu | 43/4 |

*Primary Examiner*—Kurt Rowan
*Attorney, Agent, or Firm*—Richard L. Miller, P.E.

[57] ABSTRACT

A beach trolling device comprising a flat elongated buoyant rudder and a post secured to one side and near a forward end of the rudder. The post will extend at a right angle outwardly from the side of the rudder. A fishing line is also provided. A plurality of fishing hooks are attached in spaced apart relationships onto the fishing line ear a forward end thereof. A structure is for attaching the forward end of the fishing line to a free end of the post, so that a person can troll for fish beyond the surf from the shoreline of the beach.

6 Claims, 1 Drawing Sheet

BEACH TROLLING DEVICE

BACKGROUND OF THE INVENTION

The instant invention relates generally to otter boards and more specifically it relates to beach trolling device and tethered floating fish catching devices.

Numerous otter boards have been provided in prior art that are adapted to float upon water and be pulled by moving boats, so as to catch fish. For example, U.S. Pat. Nos. 3,507,068 to Roberts; 3,748,775 to Wagner; 4,028,840 to Wille; 4,524,538 to Halvorsen; 5,165,196 to Spicklemire and 5,222,317 to Georgescu all are illustrative of such prior art. While these units may be suitable for the particular purpose to which they address, they would not be as suitable for the purposes of the present invention as heretofore described.

SUMMARY OF THE INVENTION

A primary object of the present invention is to provide a beach trolling device that will overcome the shortcomings of the prior art devices.

Another object is to provide a beach trolling device that will allow a person to troll for fish from the shoreline of a beach by utilizing a fishing line on a spool having fish hooks with bait in combination with the beach trolling device.

An additional object is to provide a beach trolling device, in which the person can release the fishing line until all the fish hooks are out beyond the surf by walking leisurely along the shoreline and keeping the fishing line taut to catch fish.

A further object is to provide a beach trolling device that is simple and easy to use.

A still further object is to provide a beach trolling device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows.

DETAILED DESCRIPTION OF THE PREFERRED EMBODIMENTS

Figure 1:
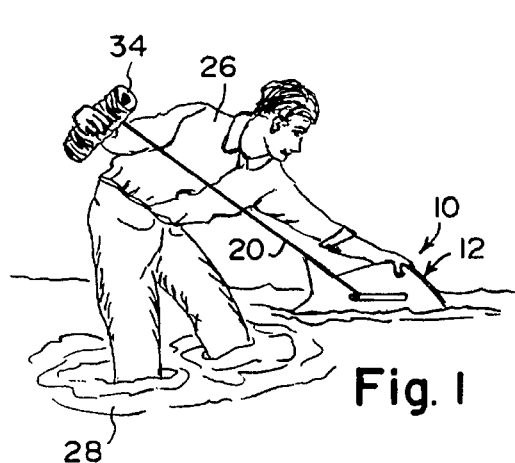
FIG. 1 is a diagrammatic perspective view of the instant invention being launched near the water's edge.
Figure 2:
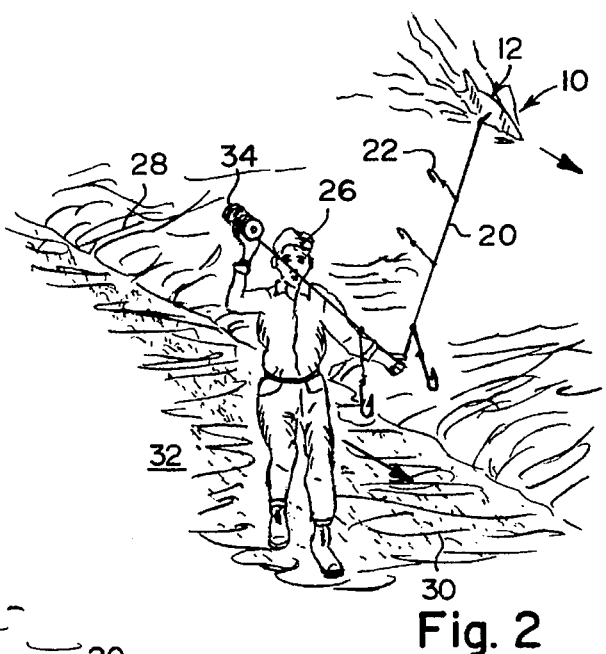
FIG. 2 is a diagrammatic perspective view of the instant invention being let out into the water at the beginning of a trolling procedure.
Figure 3:
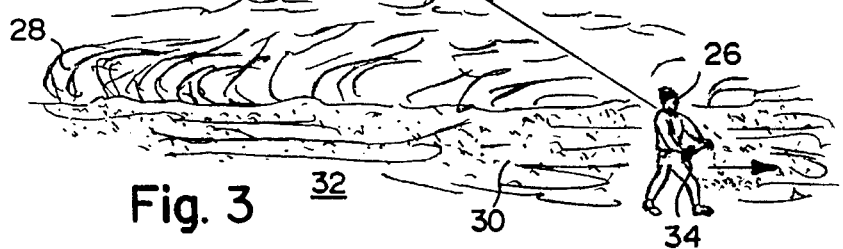
FIG. 3 is a diagrammatic perspective view illustrating the user trolling with the instant invention with a fish already caught thereon.
Figure 4:
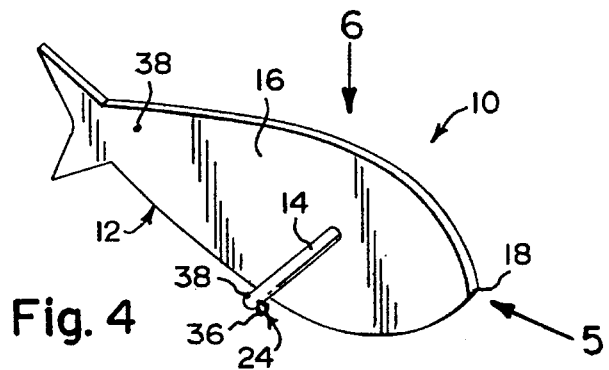
FIG. 4 is a diagrammatic perspective view of the instant invention per se.
Figure 5:
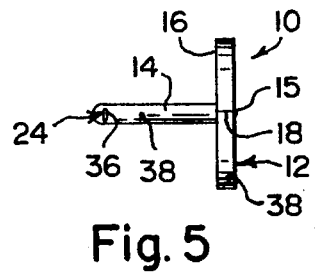
FIG. 5 is a front view taken in the direction of arrow 5 in FIG. 4.
Figure 6:
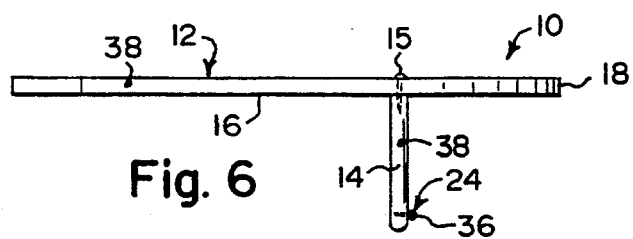
FIG. 6 is a top view taken in the direction of arrow 6 in FIG. 4.

Turning now descriptively to the drawings, in which similar reference characters denote similar elements throughout the several views, FIGS. 1 through 6 illustrate a beach trolling device 10, comprising a flat elongated buoyant rudder 12 and a post 14 secured by a fastener 15 to one side 16 and near a forward end 18 of the rudder 12. A post 14 extends at a right angle outwardly from the side 16 of the rudder 12. A fishing line 20 is also provided. A plurality of fishing hooks 22 are attached in spaced apart relationships onto the fishing line 20 near a forward end thereof. A structure 24 is for attaching said forward end of the fishing line 20 to a free end of the post 14, so that a person 26 can troll for fish beyond the surf 28 from the shoreline 30 of the beach 32.

A spool 34 is provided, to wrap the fishing line 20 thereabout. The person 26 can let some of the fishing line 20 out while walking along the shoreline 30 of the beach 32, pull the fishing line 20 taut with the rudder 12 slicing through the water and the post 14 pointed toward the person 26. The rudder 12 is in a fish-shaped configuration, to minimize water turbulence when the rudder 12 is slicing through the water beyond the surf 28, and also to tent to camouflage the presence of the device from any alert fish.

The attaching structure 24 typically is an eyelet head screw 36, having a threaded shank which threads transversely into the free end of the post 14, however numerous other structures would suffice just as well and just a hole through the end of the post (not illustrated) will also work quite well. The forward end of the fishing line 20 can be tied onto the eyelet head screw 36. The rudder 12 typically may be fabricated out of wood 38. The post 14 typically may be fabricated out of wood, plastic or metal 38.

OPERATION OF THE INVENTION

To Launch: Stand at the water's edge. Hold the rudder 12 with one hand and the spool 34 with the other hand. Release an arm's length of fishing line between them. Place the rudder 12 in the water. Walk into the water if you don't mind getting wet, so the rudder 12 will be in a foot of water pointing toward the direction in which you will be walking. The post 14 will be facing you. Keep the fishing line 20 taut as you release the rudder 12 and begin walking. The rudder 12 will pull toward the ocean's middle or lake or river. Release the fishing line 20 inch by inch as you walk. Keep the fishing line 20 taut. The rudder 12 will follow diagonally behind you. Any slack in the fishing line 20 will cause the rudder 12 to float on its side with the post 14 pointing either straight up or down. Your control comes when you pull the fishing line 20 taut and the rudder 12 slices the water with the post 14 pointing toward you.

Continue walking and trolling. Releasing the fishing line 20 until all the fishing hooks 22 are out beyond the surf 28. Now you may walk leisurely, trolling as you go, keeping the fishing line 20 taut.

Setting the fishing hook 22 and retrieving your catch: Once you feel a hit, set the fishing hook 22 with a slight yank and reel in your catch.

To reverse direction: Start walking in the opposite direction, some slack will form in the fishing line 20. Reel in the slack. The rudder 12 will reverse direction as the fishing line 20 tightens. Continue trolling the way as you did before.

Relaunching: Follow the same procedure previously described.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

The invention claimed is:

1. A beach trolling device comprising:
    a) a flat elongated buoyant rudder; said rudder being in a fish-shaped configuration to minimize water turbulence when said rudder is slicing through the water beyond the surf;
    b) a post secured to one side and near a forward end of said rudder, so that said post will extend at a right angle outwardly from said one side of said rudder;
    c) a fishing line;
    d) a plurality of fishing hooks attached in spaced apart relationships onto said fishing line near a forward end thereof;
    e) means for attaching said forward end of said fishing line to a free end of said post, so that a person can troll for fish beyond the surf from the shoreline of the beach; said attaching means including an eyelet head screw having a threaded shank threading transversely into said free end of said post, so that said forward end of said fishing line can be tied onto said eyelet head screw; and
    f) a spool to wrap said fishing line thereabout, so that the person can let some of said fishing line out while walking along the shoreline of the beach, pulling the fishing line taut with said rudder slicing through the water and said post pointed toward the person.

2. The beach trolling device as recited in claim 1, wherein said rudder is fabricated out of wood.

3. The beach trolling device as recited in claim 2, wherein said post is fabricated out of wood.

4. The beach trolling device as recited in claim 2, wherein said post is fabricated out of plastic.

5. The beach trolling device as recited in claim 2, wherein said post is fabricated out of metal.

6. A beach trolling device for catching fish comprising:
    a) a flat elongated buoyant rudder; said rudder having a fish-shaped configuration to minimize water turbulence when said rudder is slicing through the water beyond the surf and also to tend to camouflage the presence of said device from any alert fish; and
    b) means for securing a fishing line near a forward end of said rudder; said means for securing said fishing line near said forward end of said rudder including:
        i) a post secured to one side and near said forward end of said rudder, so that said post will extend at a right angle outwardly from said one side of said rudder; and
        ii) means for attaching a forward end of said fishing line to a free end of said post having at least one fish hook attached thereto, so that a person can troll for fish beyond the surf from the shoreline of the beach; said means for attaching said forward end of said fishing line to said free end of said post includes an eyelet head screw attached to said post.

* * * * *